United States Patent
Hasegawa et al.

(10) Patent No.: US 10,863,110 B2
(45) Date of Patent: Dec. 8, 2020

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Ryo Hasegawa, Saitama (JP); Masaru Kobayashi, Saitama (JP); Makoto Kobayashi, Saitama (JP); Hitoshi Sakurabu, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/813,755

(22) Filed: Mar. 10, 2020

(65) Prior Publication Data

US 2020/0213546 A1 Jul. 2, 2020

Related U.S. Application Data

(63) Continuation of application No. PCT/JP2018/025124, filed on Jul. 3, 2018.

(30) Foreign Application Priority Data

Sep. 14, 2017 (JP) ................. 2017-176908

(51) Int. Cl.
*H04N 5/262* (2006.01)
*H04N 5/238* (2006.01)

(52) U.S. Cl.
CPC ........... *H04N 5/2622* (2013.01); *H04N 5/238* (2013.01); *H04N 5/2621* (2013.01)

(58) Field of Classification Search
CPC combination set(s) only.
See application file for complete search history.

(56) References Cited

U.S. PATENT DOCUMENTS 5,999,752 A * 12/1999 Ueyama ................. G03B 7/097
                                                                                396/213
6,212,336 B1    4/2001 Tanaka et al.
(Continued)

FOREIGN PATENT DOCUMENTS

| JP | H10333221 | 12/1998 |
|---|---|---|
| JP | H11271838 | 10/1999 |

(Continued)

OTHER PUBLICATIONS

"International Search Report (Form PCT/ISA/210) of PCT/JP2018/025124," dated Aug. 28, 2018, with English translation thereof, pp. 1-2.

(Continued)

*Primary Examiner* — Paul M Berardesca
(74) *Attorney, Agent, or Firm* — JCIPRNET

(57) ABSTRACT

A digital camera that includes an imaging sensor having a stop 2 arranged in front of an imaging surface includes an imaging control unit that starts exposure of pixels on the entire imaging surface at the same time and then, ends the exposure of the pixels at the same time in a state where light from a subject is incident on the imaging surface, by controlling an imaging sensor drive circuit which drives the imaging sensor, and a processor that sequentially changes an F number of the stop 2 to a plurality of values during a period from the start of the exposure until the end of the exposure. The processor controls a time in which the F number is maintained at each of the plurality of values to be a time that is based on a function indicating light transmittance characteristics of an APD filter.

12 Claims, 8 Drawing Sheets

(56) References Cited

U.S. PATENT DOCUMENTS

| | | | |
|---|---|---|---|
| 9,131,161 B2 | 9/2015 | Yokoya | |
| 2002/0027600 A1* | 3/2002 | Yamanaka | H04N 5/238 348/208.99 |
| 2004/0201771 A1 | 10/2004 | Itoh | |
| 2006/0157760 A1* | 7/2006 | Hayashi | H04N 5/3532 257/293 |
| 2015/0077581 A1* | 3/2015 | Baltz | H04N 5/2352 348/218.1 |

FOREIGN PATENT DOCUMENTS

| | | |
|---|---|---|
| JP | 2004317650 | 11/2004 |
| JP | 2011114441 | 6/2011 |
| JP | 2015049298 | 3/2015 |
| JP | 2015204470 | 11/2015 |
| JP | 2016173444 | 9/2016 |

OTHER PUBLICATIONS

"Written Opinion of the International Searching Authority (Form PCT/ISA/237) of PCT/JP2018/025124," dated Aug. 28, 2018, with English translation thereof, pp. 1-6.

\* cited by examiner

IMAGING CONTROL DEVICE, IMAGING APPARATUS, IMAGING CONTROL METHOD, AND IMAGING CONTROL PROGRAM

CROSS REFERENCE TO RELATED APPLICATIONS

This application is a Continuation of PCT International Application No. PCT/JP2018/025124 filed on Jul. 3, 2018, which claims priority under 35 U.S.C § 119(a) to Patent Application No. 2017-176908 filed in Japan on Sep. 14, 2017, all of which are hereby expressly incorporated by reference into the present application.

BACKGROUND OF THE INVENTION

1. Field of the Invention

The present invention relates to an imaging control device, an imaging apparatus, an imaging control method, and an imaging control program.

2. Description of the Related Art

An apodization filter (APD filter) is known as an optical filter for improving an out-of-focus image that is a so-called blurred image. The APD filter is an optical filter of which the light transmittance in a plane perpendicular to an optical axis is decreased as a distance from the optical axis center is increased. The contours of the blurred image can be smoothed using the APD filter.

The cost of a lens device in which the APD filter is mounted is high. In addition, in an imaging apparatus that performs phase difference auto focus (AF), AF performance may be affected in a case where a subject is imaged through the APD filter.

Therefore, a suggestion for obtaining an APD effect without using the APD filter has been made (refer to JP2015-049298A and JP1998-333221A (JP-H10-333221A)).

In the disclosure of JP2015-049298A and JP1998-333221A (JP-H10-333221A), the APD effect is obtained by changing an F number during exposure of an imaging element.

In addition, while the obtaining of the APD effect is not intended, a technology for changing the F number during the exposure of the imaging element is disclosed in JP2016-173444A.

Furthermore, while the obtaining of the APD effect is not intended, a technology for performing imaging a plurality of times while changing the F number and compositing a captured image obtained in each imaging is disclosed in JP2015-204470A and JP2011-114441A.

SUMMARY OF THE INVENTION

An imaging apparatus disclosed in JP2015-049298A and JP2016-173444A controls an exposure time of the imaging element by a focal plane shutter. The focal plane shutter is a mechanism that exposes the imaging element by moving a slit between a front curtain and a rear curtain. Thus, a start timing of the exposure cannot be uniformed in the entire imaging surface of the imaging element.

Accordingly, as disclosed in JP2015-049298A and JP2016-173444A, in a case where imaging is performed using the focal plane shutter and a stop is changed during exposure, the degree of blurriness is changed in the upper and lower parts of the captured image obtained by the imaging.

FIG. 11 is a diagram illustrating an exposure state of the imaging surface of the imaging element in a case where imaging is performed using the focal plane shutter and the stop is changed during exposure.

In FIG. 11, a period in which the imaging surface of the imaging element is exposed is illustrated as a parallelogram block. FIG. 11 illustrates an example in which the stop is changed from F1.4 to F2.5 during the exposure period of the imaging element (a period in which the slit of the focal plane shutter is moved from the upper end to the lower end of the imaging surface).

In the example illustrated in FIG. 11, on the upper end side of the imaging surface of the imaging element, a period in which exposure is performed at an F number of F1.4 is sufficiently secured, but a period in which exposure is performed at an F number of F2.5 is not sufficiently secured. Accordingly, the captured image obtained by driving illustrated in FIG. 11 has different degrees of blurriness on the upper end side and the lower end side.

In an imaging apparatus disclosed in JP1998-333221A (JP-H10-333221A), a lens shutter that has the same configuration as the stop doubles as the stop. The imaging apparatus obtains the APD effect by changing an opening amount of the lens shutter during a period of exposing a film by opening the lens shutter.

However, the imaging apparatus needs to control the exposure time by performing open and close control of the lens shutter. Thus, it is difficult to control the exposure time. In addition, as disclosed in Paragraphs 0109-0112 in JP1998-333221A (JP-H10-333221A), the APD effect cannot be obtained depending on the length of the exposure time.

In an imaging apparatus disclosed in JP2015-204470A and JP2011-114441A, the change of the stop during one exposure and the obtaining of the APD effect are not considered, and the above problems are not recognized.

The present invention is conceived in view of the above matter. An object of the present invention is to provide an imaging control device, an imaging apparatus, an imaging control method, and an imaging control program capable of obtaining an optimal APD effect without using an APD filter.

An imaging control device of the present invention is an imaging control device incorporated in an imaging apparatus that includes an imaging element having an imaging surface on which a plurality of pixels are two-dimensionally arranged, and having a stop arranged in front of the imaging surface. The device comprises an imaging control unit that starts exposure of the pixels on the entire imaging surface at the same time and then, ends the exposure of the pixels at the same time in a state where light from a subject is incident on the imaging surface, by controlling an imaging element drive circuit which drives the imaging element, and a stop control unit that sequentially changes an F number of the stop to a plurality of values during a period from the start of the exposure until the end of the exposure, in which the stop control unit controls a time in which the F number is maintained at each of the plurality of values to be a time that is based on a function indicating a relationship between a distance from an optical axis center and a transmittance of light of an optical filter in which as the distance from the optical axis center is increased, the transmittance of light is decreased.

An imaging apparatus of the present invention comprises the imaging control device, and the imaging sensor.

An imaging control method of the present invention is an imaging control method of an imaging apparatus that includes an imaging sensor having an imaging surface on which a plurality of pixels are two-dimensionally arranged, and having a stop arranged in front of the imaging surface. The method comprises an imaging control step of starting exposure of the pixels on the entire imaging surface at the same time and then, ending the exposure of the pixels at the same time in a state where light from a subject is incident on the imaging surface, by controlling an imaging sensor drive circuit which drives the imaging sensor, and a stop control step of sequentially changing an F number of the stop to a plurality of values during a period from the start of the exposure until the end of the exposure, in which in the stop control step, a time in which the F number is maintained at each of the plurality of values is controlled to be a time that is based on a function indicating a relationship between a distance from an optical axis center and a transmittance of light of an optical filter in which as the distance from the optical axis center is increased, the transmittance of light is decreased.

A non-transitory computer recording medium storing an imaging control program of the present invention is an imaging control program for a processor of an imaging apparatus that includes an imaging sensor having an imaging surface on which a plurality of pixels are two-dimensionally arranged, and having a stop arranged in front of the imaging surface. The program causes the processor to execute an imaging control step of starting exposure of the pixels on the entire imaging surface at the same time and then, ending the exposure of the pixels at the same time in a state where light from a subject is incident on the imaging surface, by controlling an imaging sensor drive circuit which drives the imaging sensor, and a stop control step of sequentially changing an F number of the stop to a plurality of values during a period from the start of the exposure until the end of the exposure, in which in the stop control step, a time in which the F number is maintained at each of the plurality of values is controlled to be a time that is based on a function indicating a relationship between a distance from an optical axis center and a transmittance of light of an optical filter in which as the distance from the optical axis center is increased, the transmittance of light is decreased.

According to the present invention, an imaging control device, an imaging apparatus, an imaging control method, and a non-transitory computer recording medium storing an imaging control program capable of obtaining an optimal APD effect without using an APD filter can be provided.

DESCRIPTION OF THE PREFERRED EMBODIMENTS

Hereinafter, an embodiment of the present invention will be described with reference to the drawings.

Figure 1:
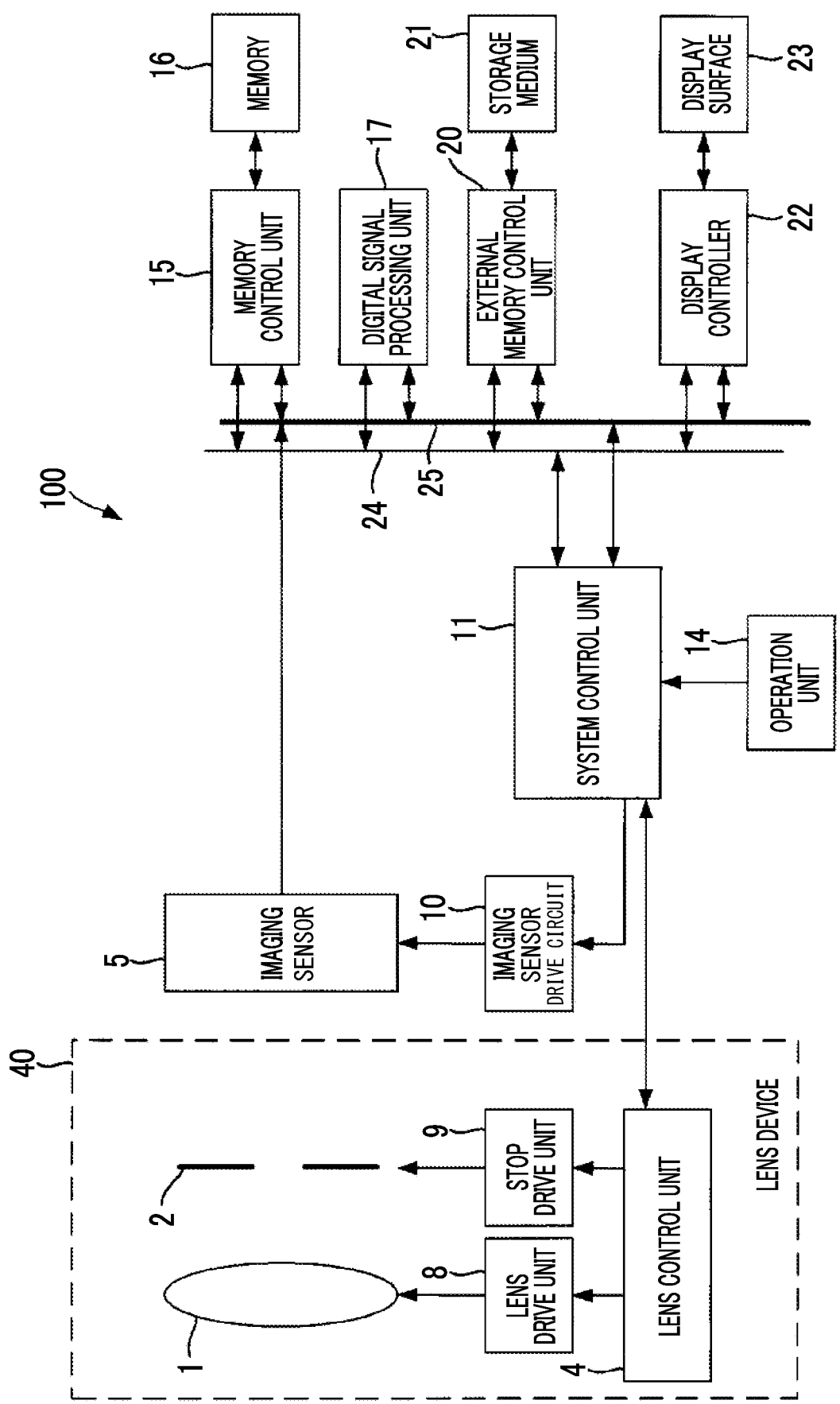
FIG. 1 is a diagram illustrating a schematic configuration of a digital camera 100 that is an imaging apparatus according to one embodiment of the present invention.

FIG. 1 is a diagram illustrating a schematic configuration of a digital camera 100 that is an imaging apparatus according to one embodiment of the present invention.

The digital camera 100 illustrated in FIG. 1 comprises a lens device 40 that includes an imaging lens 1, a stop 2, a lens control unit 4, a lens drive unit 8, and a stop drive unit 9.

The lens device 40 may be attachable and detachable with respect to a main body of the digital camera 100 or may be integrated with the main body of the digital camera 100.

The imaging lens 1 includes a focus lens, a zoom lens, or the like that can be moved in an optical axis direction.

The lens control unit 4 of the lens device 40 is configured to be capable of communicating with a system control unit 11 of the digital camera 100 in a wired or wireless manner.

In accordance with an instruction from the system control unit 11, the lens control unit 4 changes the position of a principal point of the focus lens by controlling the focus lens included in the imaging lens 1 through the lens drive unit 8, changes the position (focal length) of the zoom lens by controlling the zoom lens included in the imaging lens 1 through the lens drive unit 8, or controls an F number of the stop 2 through the stop drive unit 9.

The digital camera 100 further comprises a MOS type imaging sensor 5 that images a subject through an imaging optical system including the imaging lens 1 and the stop 2.

The imaging sensor 5 includes an imaging surface on which a plurality of pixels are two-dimensionally arranged, converts a subject image formed on the imaging surface by the imaging optical system into pixel signals by the plurality of pixels, and outputs the pixel signals. Hereinafter, a set of pixel signals output from the pixels of the imaging sensor 5 will be referred to as a captured image signal.

The imaging sensor 5 images the subject through the imaging optical system in a state where a focal plane shutter or a mechanical shutter such as a lens shutter as a separate unit from the stop 2 is not arranged in front of the imaging surface. That is, the digital camera 100 is a so-called mechanical shutterless camera.

The system control unit 11 that manages and controls the entire electric control system of the digital camera 100 drives the imaging sensor 5 through the imaging sensor drive unit 10 and outputs the subject image captured through the imaging optical system of the lens device 40 as the captured image signal.

The imaging sensor drive circuit 10 drives the imaging sensor 5 by generating a drive signal based on an instruction from the system control unit 11 and supplying the drive signal to the imaging sensor 5. A hardware configuration of the imaging sensor drive circuit 10 is an electric circuit configured by combining circuit elements such as semiconductor elements.

A command signal from a user is input into the system control unit 11 through an operation unit 14. The operation unit 14 includes a touch panel integrated with a display surface 23, described later, various buttons, and the like.

The system control unit 11 manages and controls the entire digital camera 100. A hardware structure of the system control unit 11 corresponds to various processors that perform processes by executing programs including an imaging control program.

The various processors include a central processing unit (CPU) that is a general-purpose processor performing various processes by executing a program, a programmable logic device (PLD) that is a processor of which a circuit configuration can be changed after manufacturing like a field programmable gate array (FPGA), or a dedicated electric circuit that is a processor having a circuit configuration dedicatedly designed to execute a specific process like an application specific integrated circuit (ASIC).

More specifically, a structure of the various processors is an electric circuit in which circuit elements such as semiconductor elements are combined.

The system control unit 11 may be configured with one of the various processors or may be configured with a combination of two or more processors of the same type or different types (for example, a combination of a plurality of FPGAs or a combination of a CPU and an FPGA).

Furthermore, the electric control system of the digital camera 100 comprises a memory 16 including a random access memory (RAM) and a read only memory (ROM), a memory control unit 15 that controls data storage in the memory 16 and data read from the memory 16, a digital signal processing unit 17 that generates captured image data in accordance with various formats such as Joint Photographic Experts Group (JPEG) format by performing digital signal processing on the captured image signal output from the imaging sensor 5, an external memory control unit 20 that controls data storage in a storage medium 21 and data read from the storage medium 21, the display surface 23 configured with an organic electroluminescence (EL) panel, a liquid crystal panel, or the like, and a display controller 22 that controls display on the display surface 23.

The ROM included in the memory 16 stores programs executed by the system control unit 11 including the imaging control program.

The storage medium 21 is a semiconductor memory such as a flash memory incorporated in the digital camera 100, a portable semiconductor memory that is attachable and detachable with respect to the digital camera 100, or the like.

The memory control unit 15, the digital signal processing unit 17, the external memory control unit 20, and the display controller 22 are connected to each other through a control bus 24 and a data bus 25 and are controlled by instructions from the system control unit 11.

A hardware structure of the digital signal processing unit 17 corresponds to the above illustrated various processors that perform processes by executing programs.

The display controller 22 includes the above illustrated various processors that perform processes by executing programs, and a display memory for holding data of an image to be displayed on the display surface 23.

Figure 2:
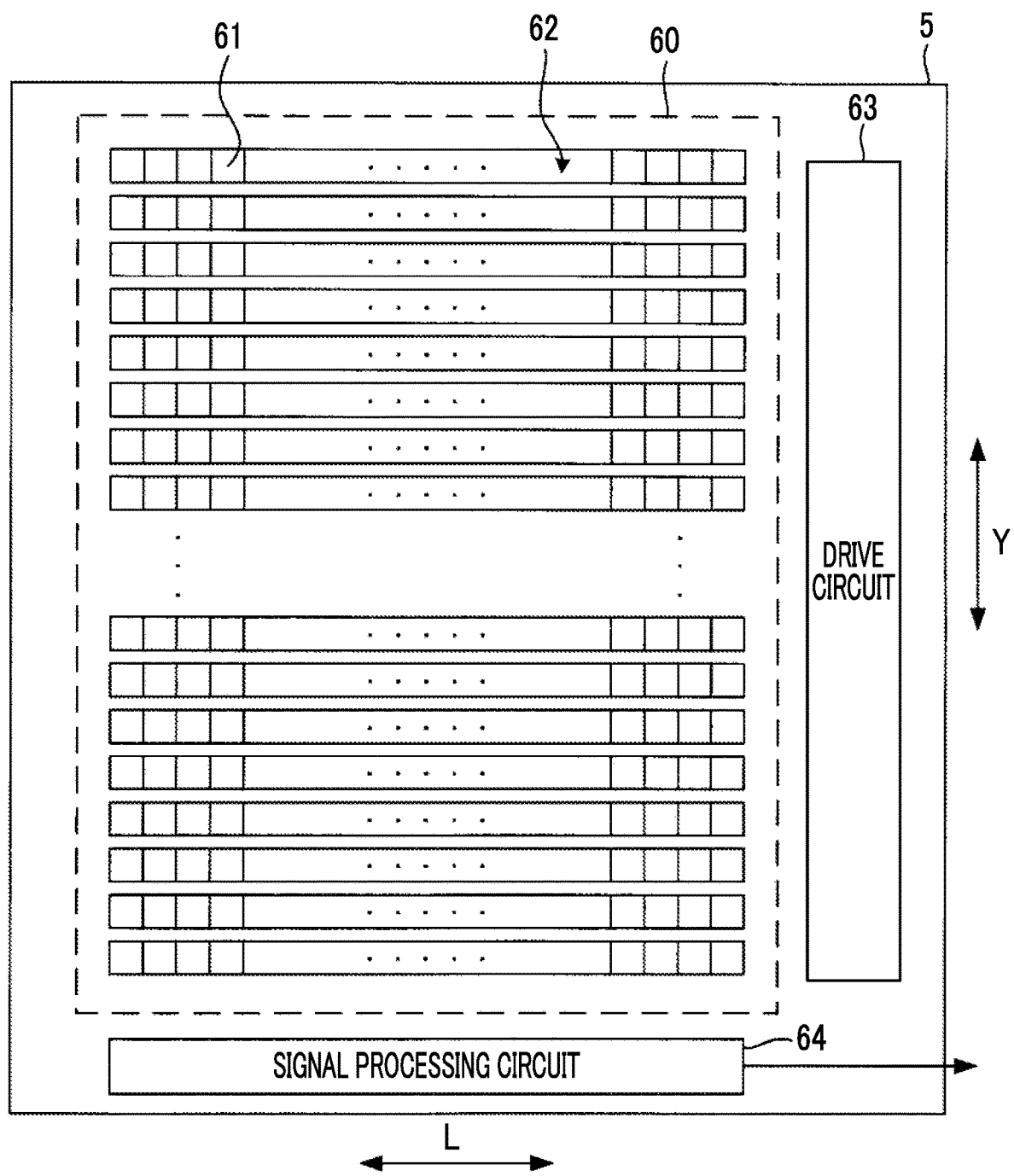
FIG. 2 is a schematic plan view illustrating a schematic configuration of an imaging sensor 5 illustrated in FIG. 1.

FIG. 2 is a schematic plan view illustrating a schematic configuration of the imaging sensor 5 illustrated in FIG. 1.

The imaging sensor 5 comprises an imaging surface 60 on which a plurality of pixel rows 62 each including a plurality of pixels 61 arranged in a row direction L that is a first direction are arranged in a column direction Y that is a second direction and is orthogonal to the row direction L, a drive circuit 63 that drives the pixels 61 arranged on the imaging surface 60, and a signal processing circuit 64 that processes a pixel signal read into a signal line from each pixel 61 of the pixel rows 62 arranged on the imaging surface 60.

Hereinafter, in FIG. 2, an end portion of the imaging surface 60 on one end side (an upper side in FIG. 2) of the column direction Y will be referred to as an upper end, and an end portion of the imaging surface 60 on the other end side (a lower side in FIG. 2) of the column direction Y will be referred to as a lower end.

Figure 3:
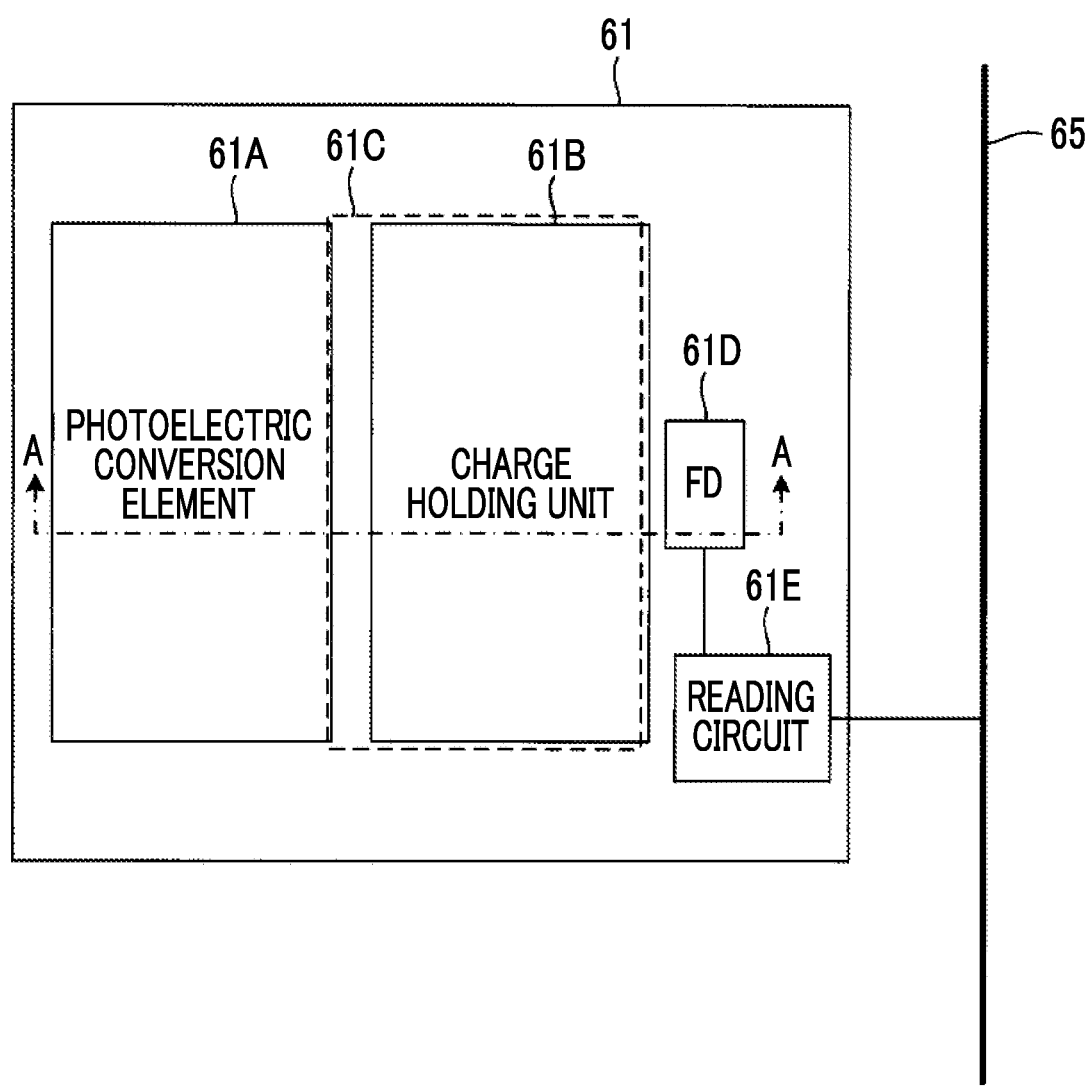
FIG. 3 is a schematic plan view illustrating a schematic configuration of a pixel 61 of the imaging sensor 5 illustrated in FIG. 2.

FIG. 3 is a schematic plan view illustrating a schematic configuration of the pixel 61 of the imaging sensor 5 illustrated in FIG. 2.

As illustrated in FIG. 3, the pixel 61 comprises a photoelectric conversion element 61A, a charge holding unit 61B, a charge transfer unit 61C, a floating diffusion 61D, and a reading circuit 61E formed on a semiconductor substrate.

The photoelectric conversion element 61A receives light passing through the imaging optical system of the lens device 40 and generates and accumulates charges corresponding to a light reception intensity. For example, the photoelectric conversion element 61A is configured with a silicon photodiode formed in the semiconductor substrate.

The charge transfer unit 61C transfers the charges accumulated in the photoelectric conversion element 61A to the charge holding unit 61B. The charge transfer unit 61C is configured with an impurity region in the semiconductor substrate and an electrode formed above the impurity region.

The charges are transferred to the charge holding unit 61B from the photoelectric conversion element 61A by controlling a voltage applied to the electrode constituting the charge transfer unit 61C by the drive circuit 63 (refer to FIG. 2).

The charge holding unit 61B holds the charges transferred from the photoelectric conversion element 61A by the charge transfer unit 61C. The charge holding unit 61B is configured with an impurity region in the semiconductor substrate.

The floating diffusion 61D converts charges into a voltage signal. The charges held in the charge holding unit 61B are transferred to the floating diffusion 61D.

The reading circuit 61E is a circuit that reads out the voltage signal corresponding to a potential of the floating diffusion 61D into a signal line 65 as a pixel signal. The reading circuit 61E is driven by the drive circuit 63 illustrated in FIG. 2.

Figure 4:
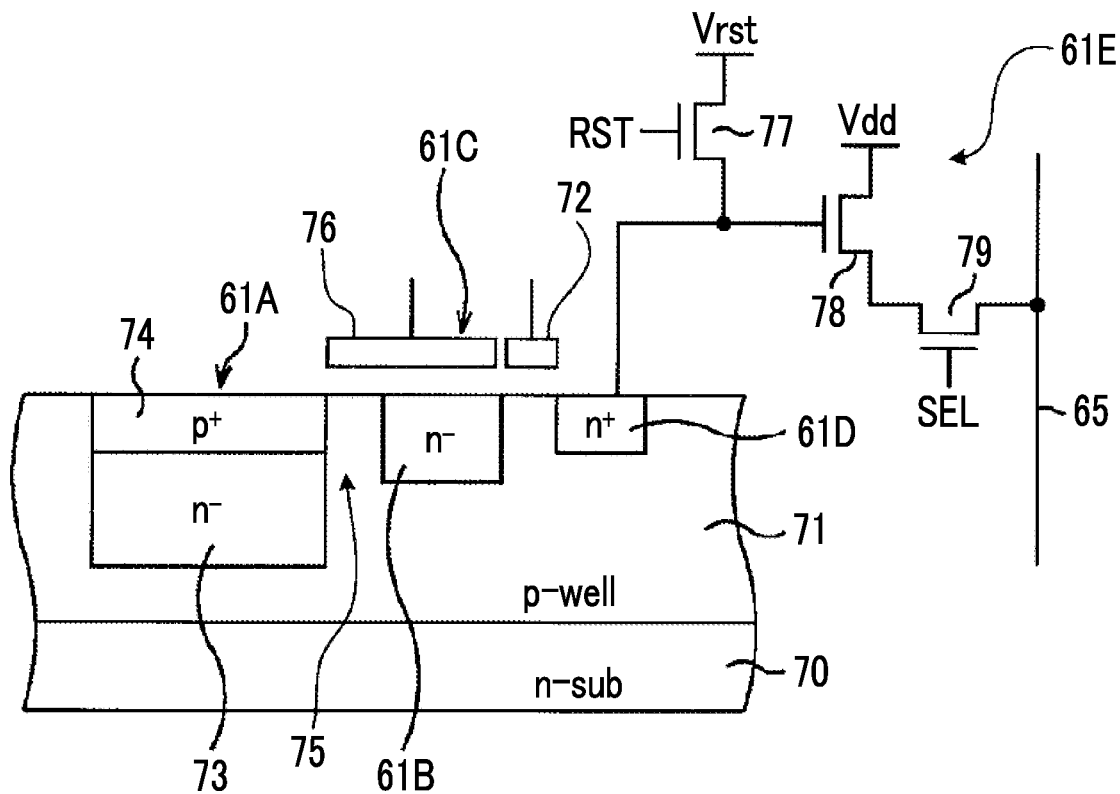
FIG. 4 is a schematic A-A cross sectional view of the pixel 61 illustrated in FIG. 3.

FIG. 4 is a schematic A-A cross sectional view of the pixel 61 of the imaging sensor 5 illustrated in FIG. 3.

As illustrated in FIG. 4, a P-well layer 71 is formed on a surface of an N-type substrate 70, and the photoelectric conversion element 61A is formed on a surface portion of the P-well layer 71.

The photoelectric conversion element 61A is configured with an N-type impurity layer 73 and a P-type impurity layer 74 formed on the N-type impurity layer 73. The N-type substrate 70 and the P-well layer 71 constitute the semiconductor substrate.

On the surface portion of the P-well layer 71, the charge holding unit 61B that includes an N-type impurity layer is formed to be spaced from the photoelectric conversion element 61A.

A transfer electrode 76 is formed above a region 75 of the P-well layer 71 between the charge holding unit 61B and the photoelectric conversion element 61A through an oxidation film, not illustrated.

The region 75 and the transfer electrode 76 constitute the charge transfer unit 61C in FIG. 3. In the example in FIG. 4, the transfer electrode 76 is formed up to above the charge holding unit 61B. However, the transfer electrode 76 may be formed above at least the region 75.

By forming a channel in the region 75 by controlling a potential of the transfer electrode 76, the charges accumulated in the photoelectric conversion element 61A can be transferred to the charge holding unit 61B. The potential of the transfer electrode 76 is controlled by the drive circuit 63 in FIG. 2.

On the surface portion of the P-well layer 71, the floating diffusion 61D that includes an N-type impurity layer is formed to be spaced from the charge holding unit 61B.

A reading electrode 72 is formed above the P-well layer 71 between the charge holding unit 61B and the floating diffusion 61D through an oxidation film, not illustrated.

By forming a channel in a region between the charge holding unit 61B and the floating diffusion 61D by controlling a potential of the reading electrode 72, the charges held in the charge holding unit 61B can be transferred to the floating diffusion 61D. The potential of the reading electrode 72 is controlled by the drive circuit 63 in FIG. 2.

In the example illustrated in FIG. 4, the reading circuit 61E is configured with a reset transistor 77 that resets the potential of the floating diffusion 61D, an output transistor 78 that converts the potential of the floating diffusion 61D into a pixel signal and outputs the pixel signal, and a selection transistor 79 for selectively reading out the pixel signal output from the output transistor 78 into the signal line 65. The configuration of the reading circuit is one example and is not for limitation purposes.

The reading circuit 61E may be shared by the plurality of pixels 61.

While the photoelectric conversion element 61A is configured with a silicon photodiode, the photoelectric conversion element 61A may also be configured with a film of an organic or inorganic photoelectric conversion material formed above the semiconductor substrate and an impurity region formed in the semiconductor substrate for accumulating charges generated in the film. In this case, the charges accumulated in the impurity region are transferred to the charge holding unit 61B in FIG. 4.

The drive circuit 63 illustrated in FIG. 2 performs resetting of each photoelectric conversion element 61A included in the pixel row 62 (emission of the charges accumulated in the photoelectric conversion element 61A), reading of the pixel signal corresponding to the charges accumulated in each photoelectric conversion element 61A into the signal line 65, and the like by driving the transfer electrode 76, the reading electrode 72, and the reading circuit 61E of each pixel 61 independently for each pixel row 62.

In addition, the drive circuit 63 transfers the charges to the charge holding unit 61B from the photoelectric conversion element 61A of each pixel 61 at the same time by driving the charge transfer units 61C of all pixels 61 at the same time. The drive circuit 63 is controlled by the imaging element drive circuit 10.

The resetting of the photoelectric conversion element 61A is performed by resetting the floating diffusion 61D by the reset transistor 77 in a state where the charge transfer unit 61C can transfer the charges and a channel is formed in the semiconductor substrate below the reading electrode 72.

The resetting of the photoelectric conversion element 61A may be configured to be performed by separately providing a charge emission region adjacent to the photoelectric conversion element 61A and emitting the charges accumulated in the photoelectric conversion element 61A to the charge emission region by the drive circuit 63.

The signal processing circuit 64 illustrated in FIG. 2 performs correlative double sampling processing on the pixel signal read into the signal line 65 from each pixel 61 of the pixel row 62, converts the pixel signal after the correlative double sampling processing into a digital signal, and outputs the digital signal to the data bus 25. The signal processing circuit 64 is controlled by the imaging sensor drive circuit 10.

The digital signal processing unit 17 generates the captured image data by performing signal processing such as a demosaicing process and gamma-correction processing on the pixel signal output to the data bus 25 from the imaging sensor 5.

Figure 5:
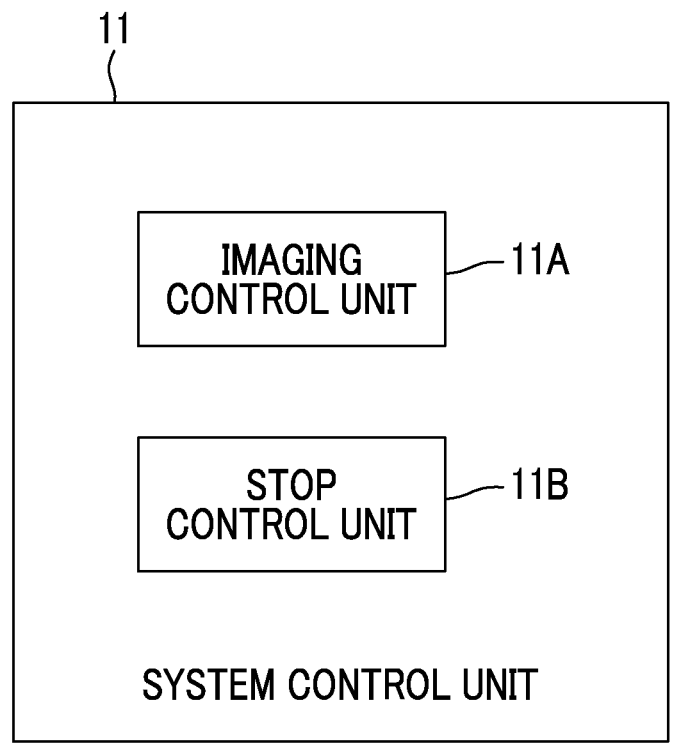
FIG. 5 is a function block diagram of a system control unit 11 in the digital camera 100 illustrated in FIG. 1.

FIG. 5 is a function block diagram of the system control unit 11 in the digital camera 100 illustrated in FIG. 1.

The digital camera 100 illustrated in FIG. 1 is equipped with an APD mode as an imaging mode. The APD mode is an imaging mode in which the captured image having a degree of blurriness equivalent to the degree of blurriness in a case where the APD filter is used is obtained by sequentially changing the F number of the stop 2 to a plurality of values during the exposure period in which the imaging surface 60 of the imaging sensor 5 is exposed. Function blocks illustrated in FIG. 5 show function blocks of the system control unit 11 in a case where the APD mode is set.

As illustrated in FIG. 5, by executing the programs stored in the ROM of the memory 16 including the imaging control program, the system control unit 11 functions as an imaging control device that comprises an imaging control unit 11A and a stop control unit 11B.

By controlling the imaging sensor drive circuit 10, the imaging control unit 11A starts exposure of all pixels 61 at the same time on the entire imaging surface 60 and then, ends the exposure at the same time. Specifically, the imaging control unit 11A causes the imaging sensor drive circuit 10 to execute driving that includes a set of global reset driving, global shutter driving, and rolling read-out driving.

The global reset driving is driving in which the exposure of all pixels 61 is started at the same time by resetting each photoelectric conversion element 61A of all pixels 61 on the imaging surface 60 at the same time.

The global shutter driving is driving in which the exposure is ended in each pixel 61 at the same time by transferring the charges that are accumulated in the photoelectric conversion sensor 61A of each pixel 61 by the exposure started in each pixel 61 by the global reset driving to the charge holding unit 61B of each pixel 61.

The rolling read-out driving is driving in which the pixel row 62 including the pixel 61 in which charges are held in the charge holding unit 61B by the global shutter driving is sequentially selected from the upper end side to the lower end side of the imaging surface 60, and the pixel signal corresponding to the charges held in the charge holding unit 61B of the selected pixel row 62 is read out into the signal line 65.

The stop control unit 11B sequentially changes the F number of the stop 2 to a plurality of values during a period (hereinafter, referred to as an exposure period) from the start of the exposure started under control of the imaging control unit 11A until the end of the exposure.

In the ROM of the memory 16, a plurality of sets of stop control data in which a plurality of F numbers to be set in the exposure period are associated with a time (hereinafter, referred to as a maintenance time) in which a state where control is performed to each of the plurality of F numbers is to be maintained are stored in correspondence with an imaging condition such as a focal length, imaging sensitivity, or an exposure value of the imaging lens 1.

The stop control unit 11B reads out the stop control data corresponding to the imaging condition determined in the exposure period from the ROM and performs variable control of the F number of the stop 2 based on the read stop control data.

Figure 6:
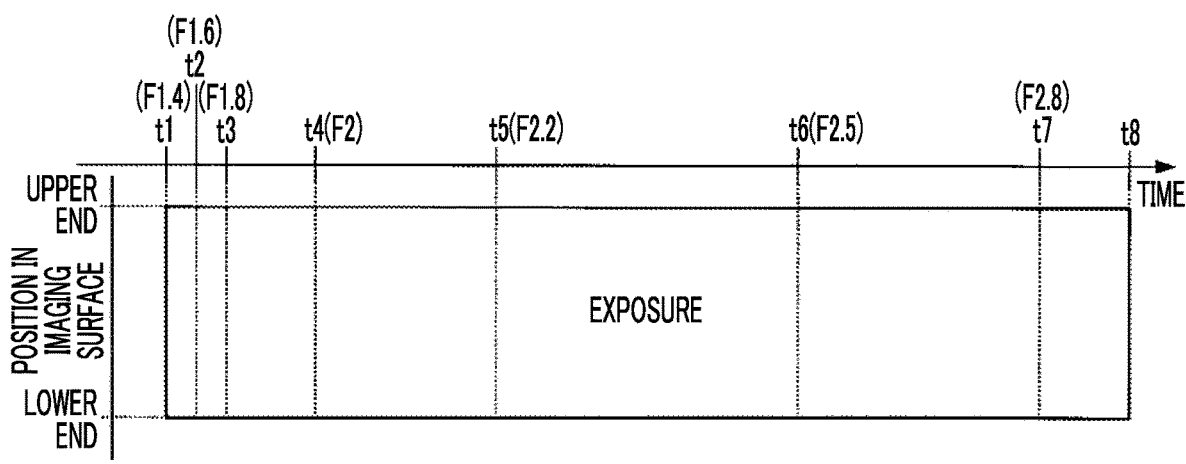
FIG. 6 is a diagram illustrating one example of variable control of an F number of a stop 2 based on stop control data.

FIG. 6 is a diagram illustrating one example of the variable control of the F number of the stop 2 based on the stop control data. In FIG. 6, total seven examples in which the plurality of F numbers included in the stop control data are F1.4, F1.6, F1.8, F2, F2.2, F2.5, and F2.8 are illustrated. One or both of the number of F numbers and the value of each F number are changed depending on the imaging condition.

In addition, in FIG. 6, an example in which the ratio of the maintenance time corresponding to each of the seven F numbers (maintenance time corresponding to F1.4:maintenance time corresponding to F1.6:maintenance time corresponding to F1.8:maintenance time corresponding to F2:maintenance time corresponding to F2.2:maintenance time corresponding to F2.5:maintenance time corresponding to F2.8) included in the stop control data is 1:1:3:6:10:8:3 is illustrated.

As illustrated in FIG. 6, in a case where an imaging instruction is provided by the user in the APD mode, the global shutter driving is performed at time t1 under control of the imaging control unit 11A in a state where light from the subject is incident on the imaging surface 60. By the global shutter driving, the exposure of the pixels 61 is started at the same time on the entire imaging surface 60.

In a case where time t8 is reached after an elapse of a predetermined time from time t1, the global reset driving is performed under control of the imaging control unit 11A. By the global reset driving, the exposure of the pixels 61 started at time t1 is ended at the same time on the entire imaging surface 60. As illustrated in FIG. 6, at any position from the upper end to the lower end of the imaging surface 60, the exposure is started at the same time, and the exposure is ended at the same time.

In the exposure period between time t1 and time t8, at time t1, the F number of the stop 2 is controlled to be F1.4 under control of the stop control unit 11B.

At time t2 after an elapse of a predetermined time T from time t1, the F number of the stop 2 is controlled to be F1.6 under control of the stop control unit 11B. At time t3 after an elapse of the predetermined time T from time t2, the F number of the stop 2 is controlled to be F1.8 under control of the stop control unit 11B.

At time t4 after an elapse of three times the predetermined time T from time t3, the F number of the stop 2 is controlled to be F2 under control of the stop control unit 11B.

At time t5 after an elapse of six times the predetermined time T from time t4, the F number of the stop 2 is controlled to be F2.2 under control of the stop control unit 11B.

At time t6 after an elapse of 10 times the predetermined time T from time t5, the F number of the stop 2 is controlled to be F2.5 under control of the stop control unit 11B.

At time t7 after an elapse of eight times the predetermined time T from time t6, the F number of the stop 2 is controlled to be F2.8 under control of the stop control unit 11B.

Then, time t8 is reached after an elapse of three times the predetermined time T from time t7, and the exposure period is ended.

By the variable control of the stop 2, a light reception intensity of the pixel 61 near the center of the imaging surface 60 of the imaging sensor 5 is greater than a light reception intensity of the pixel 61 in a periphery portion of the imaging surface 60 of the imaging sensor 5, and the captured image obtained by the exposure during the exposure period can be obtained as being equivalent to a captured image in a case where the subject is imaged through the APD filter.

Figure 7:
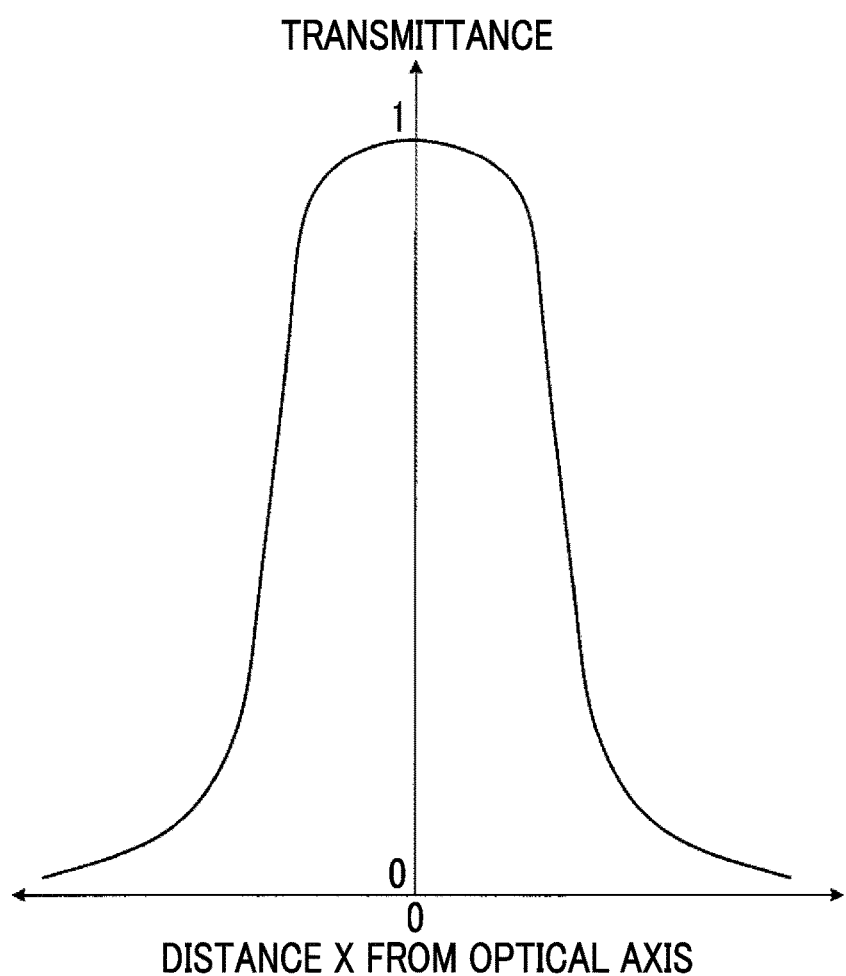
FIG. 7 is a diagram illustrating one example of light transmittance characteristics of an APD filter.

FIG. 7 is a diagram illustrating one example of light transmittance characteristics of the APD filter.

A horizontal axis illustrated in FIG. 7 denotes a distance X from an optical axis center in a plane that passes through the optical axis center of the APD filter and is perpendicular to an optical axis of the APD filter.

A vertical axis illustrated in FIG. 7 denotes a light transmittance of the APD filter at a position of the distance X from the optical axis center. The light transmittance of the vertical axis illustrated in FIG. 7 is a value that is normalized such that the light transmittance at a position of distance X=0 (that is, the optical axis center) is the maximum value "1".

The APD filter has optical characteristics such that as the distance from the optical axis center is increased, the light transmittance is decreased. According to the APD filter, a periphery light intensity of light incident on the imaging surface 60 can be decreased, and the contours of the blurred image caused by out-of-focus can be provided with gradations.

The stop control data used in the variable control of the stop 2 illustrated in FIG. 6 is created based on a predetermined function (specifically, a Gaussian function) showing the light transmittance characteristics of the APD filter illustrated in FIG. 7. This function is not limited to a curve illustrated in FIG. 7, and an appropriate function may be used depending on necessary imaging performance.

Hereinafter, one example of a method of generating the stop control data will be described.

The plurality of F numbers constituting the stop control data may be all F numbers of the stop 2 that can be set, or may be F numbers randomly selected from all F numbers. Hereinafter, an example in which total seven F numbers of F1.4, F1.6, F1.8, F2, F2.2, F2.5, and F2.8 are decided as the plurality of F numbers constituting the stop control data will be described.

In a case where the F numbers are decided, a distance x from the optical axis center of the stop 2 to a periphery of an opening portion of the stop 2 in a state where the stop 2 is controlled to have each decided F number is calculated.

The F number of the stop 2 is represented by F number=f/(2*x) . . . (1) with the focal length of the imaging lens 1 denoted by "f". In a case where Expression (1) is solved with respect to the distance x, x=f/(2*F number) . . . (2) is obtained.

Accordingly, by substituting a specific focal length f and each decided F number in Expression (2), the distance x can be calculated for each decided F number.

The distance x calculated for F1.4 is denoted by "x1". The distance x calculated for F1.6 is denoted by "x2". The distance x calculated for F1.8 is denoted by "x3". The distance x calculated for F2 is denoted by "x4". The distance x calculated for F2.2 is denoted by "x5". The distance x calculated for F2.5 is denoted by "x6". The distance x calculated for F2.8 is denoted by "x7".

Figure 8:
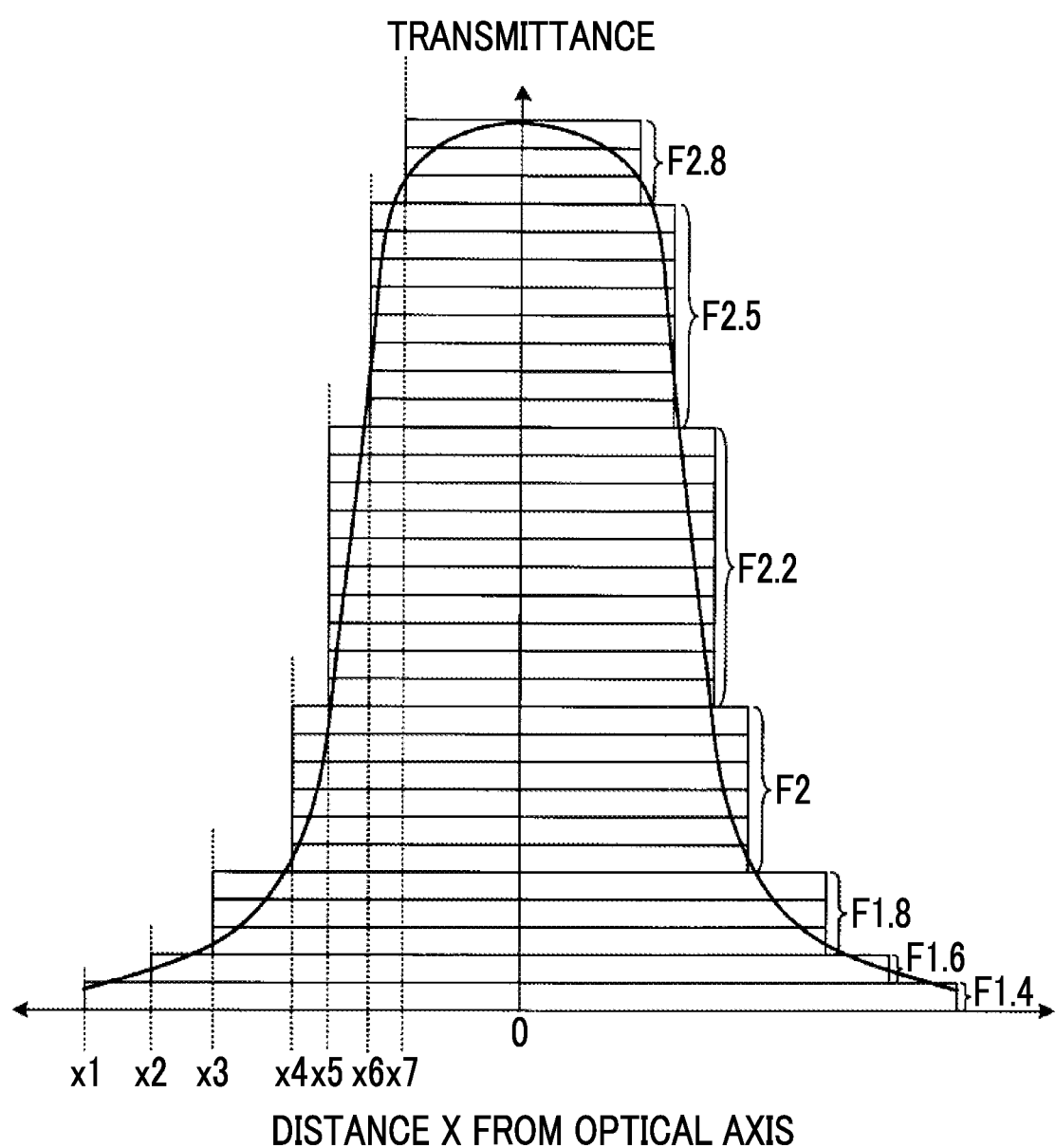
FIG. 8 is a schematic diagram for describing a method of calculating a maintenance time for each F number.

A diagram illustrated in FIG. 8 is obtained by adding straight lines of distance X=x1 to x7 to the graph illustrated in FIG. 7.

In FIG. 8, a light intensity that corresponds to an area of a region surrounded by the curve illustrated by the Gaussian function, the straight line of X=x1, the straight line of X=x2, and a horizontal axis is a light intensity that is to pass through the stop 2 in the state of F1.4. The light intensity that passes through the stop 2 per unit time in a state where the focal length f is controlled to be a specific value and the stop 2 is controlled to have each F number is known. Thus, a time necessary for obtaining the light intensity corresponding to the area in the state of F1.4 can be obtained as a maintenance time TF1.4 corresponding to F1.4.

In FIG. 8, a time that is obtained by subtracting the maintenance time TF1.4 from a time necessary for obtaining a light intensity corresponding to an area of a region surrounded by the curve illustrated by the Gaussian function, the straight line of X=x2, the straight line of X=x3, and the horizontal axis in the state of F1.6 can be obtained as a maintenance time TF1.6 corresponding to F1.6.

In FIG. 8, a time that is obtained by subtracting the maintenance time TF1.4 and the maintenance time TF1.6 from a time necessary for obtaining a light intensity corresponding to an area of a region surrounded by the curve illustrated by the Gaussian function, the straight line of X=x3, the straight line of X=x4, and the horizontal axis in the state of F1.8 can be obtained as a maintenance time TF1.8 corresponding to F1.8.

In FIG. 8, a time that is obtained by subtracting the maintenance time TF1.4, the maintenance time TF1.6, and the maintenance time TF1.8 from a time necessary for obtaining a light intensity corresponding to an area of a region surrounded by the curve illustrated by the Gaussian function, the straight line of X=x4, the straight line of X=x5, and the horizontal axis in the state of F2 can be obtained as a maintenance time TF2 corresponding to F2.

In FIG. 8, a time that is obtained by subtracting the maintenance time TF1.4, the maintenance time TF1.6, the maintenance time TF1.8, and the maintenance time TF2 from a time necessary for obtaining a light intensity corresponding to an area of a region surrounded by the curve illustrated by the Gaussian function, the straight line of X=x5, the straight line of X=x6, and the horizontal axis in the state of F2.2 can be obtained as a maintenance time TF2.2 corresponding to F2.2.

In FIG. 8, a time that is obtained by subtracting the maintenance time TF1.4, the maintenance time TF1.6, the maintenance time TF1.8, the maintenance time TF2, and the maintenance time TF2.2 from a time necessary for obtaining a light intensity corresponding to an area of a region surrounded by the curve illustrated by the Gaussian function, the straight line of X=x6, the straight line of X=x7, and the horizontal axis in the state of F2.5 can be obtained as a maintenance time TF2.5 corresponding to F2.5.

In FIG. 8, a time that is obtained by subtracting the maintenance time TF1.4, the maintenance time TF1.6, the maintenance time TF1.8, the maintenance time TF2, the maintenance time TF2.2, and the maintenance time TF2.5 from a time necessary for obtaining a light intensity corresponding to an area of a region surrounded by the curve illustrated by the Gaussian function, the straight line of X=x7, a vertical axis, and the horizontal axis in the state of F2.8 can be obtained as a maintenance time TF2.8 corresponding to F2.8.

In FIG. 8, the light intensity passing through the stop 2 in a case where the state of F1.4 is maintained for the maintenance time TF1.4 is schematically illustrated by the height of a rectangular block adjacent to "F1.4".

The light intensity passing through the stop 2 in a case where the state of F1.6 is maintained for the maintenance time TF1.6 is schematically illustrated by the height of a rectangular block adjacent to "F1.6".

The light intensity passing through the stop 2 in a case where the state of F1.8 is maintained for the maintenance time TF1.8 is schematically illustrated by the height of a rectangular block adjacent to "F1.8".

The light intensity passing through the stop 2 in a case where the state of F2 is maintained for the maintenance time TF2 is schematically illustrated by the height of a rectangular block adjacent to "F2".

The light intensity passing through the stop 2 in a case where the state of F2.2 is maintained for the maintenance time TF2.2 is schematically illustrated by the height of a rectangular block adjacent to "F2.2".

The light intensity passing through the stop 2 in a case where the state of F2.5 is maintained for the maintenance time TF2.5 is schematically illustrated by the height of a rectangular block adjacent to "F2.5".

The light intensity passing through the stop 2 in a case where the state of F2.8 is maintained for the maintenance time TF2.8 is schematically illustrated by the height of a rectangular block adjacent to "F2.8".

In the example in FIG. 8, F1.4 is a first value, F2.8 is a second value, and F2.5, F2.2, or F2 is a third value between the first value and the second value.

In the above manner, one stop control data is generated with respect to the specific focal length f. By performing the above process by sequentially changing the specific focal length f to all values that can be set in the digital camera 100, the stop control data is generated for each of all focal lengths that can be set in the digital camera 100. In addition, by deciding the number or each value of the plurality of F numbers for each combination of the imaging sensitivity and the exposure value and performing the above process with respect to each focal length f using the decided F number, the stop control data is generated for each imaging condition.

According to the digital camera 100 in FIG. 1, under control of the imaging control unit 11A, the exposure periods of the pixels 61 are unified on the entire imaging surface 60, and in that state, the variable control of the F number of the stop 2 is performed during the exposure period. Thus, the captured image obtained in the exposure period does not have a difference in the state of blurriness between the upper end side and the lower end side, and a favorable APD effect can be obtained.

In addition, in the digital camera 100 in FIG. 1, the start timing and the end timing of the exposure period for obtaining the captured image are determined by driving of the imaging sensor 5 under control of the imaging control unit 11A. That is, control of the stop 2 and control of the exposure period are independently performed. Thus, the control of the exposure period is facilitated, and even in a case where the exposure period is short, the APD effect can be securely obtained.

In addition, in the digital camera 100 in FIG. 1, the stop control unit 11B performs the variable control of the F number of the stop 2 based on the stop control data corresponding to the imaging condition that is set at the time of imaging. Thus, even in a case where the imaging condition is changed, the captured image having the APD effect can be obtained, and usability can be improved.

While the digital camera 100 is configured to have a variable focal length of the imaging lens 1, the focal length may be fixed. Alternatively, the focal length of the imaging lens 1 may be configured to be variable in other imaging modes and be fixed in the APD mode.

In the description thus far, an example in which the number of F numbers included in the stop control data is seven is illustrated. However, in a case where the number of F numbers is at least two, a captured image that is similar to the captured image in a case where the APD filter is used can be obtained. By setting the number of F numbers to three or more and preferably, five or more, a captured image that is more similar to the captured image in a case where the APD filter is used can be obtained.

The imaging sensor 5 of the digital camera 100 may be any imaging sensor that can be driven to start the exposure in all pixels at the same time and end the exposure at the same time without using a mechanical shutter. For example, the imaging sensor 5 may be a charge coupled device (CCD) image sensor.

In addition, while the mechanical shutter is not mounted in the digital camera 100, the mechanical shutter may be mounted in the digital camera 100.

In this case, in the APD mode, the mechanical shutter may be disabled, and the imaging control unit 11A may control the exposure of all pixels 61 to be started at the same time and be ended at the same time in a state where the mechanical shutter is open and light from the subject is incident on the imaging surface 60.

Next, a configuration of a smartphone as the imaging apparatus according to the embodiment of the present invention will be described.

Figure 9:
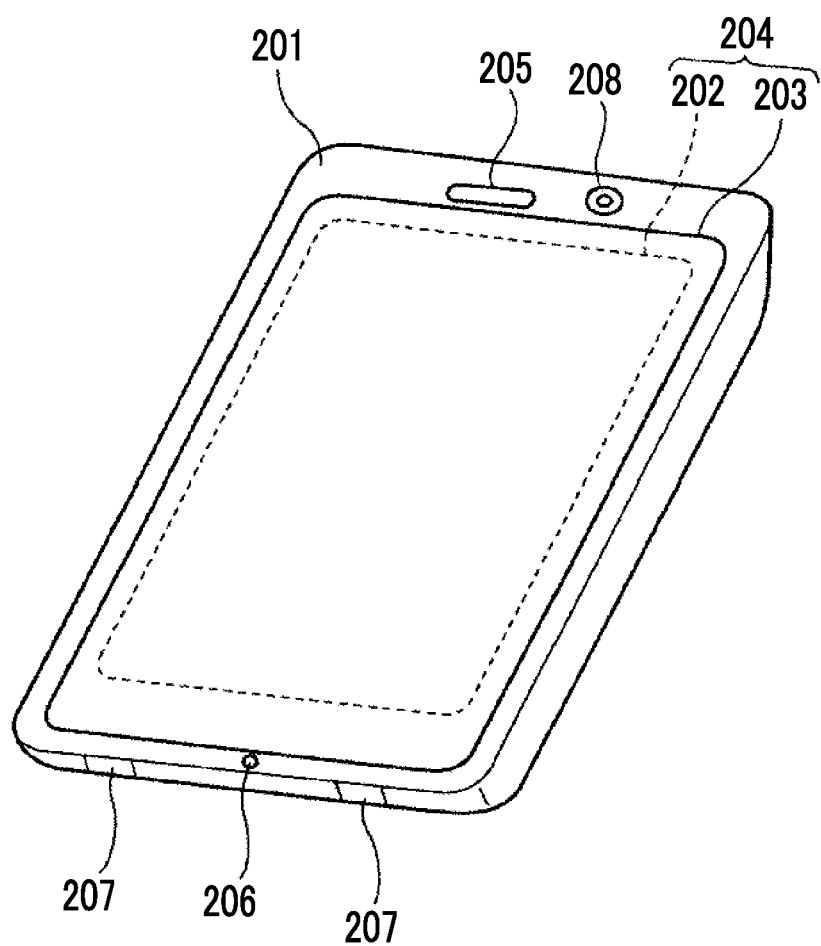
FIG. 9 illustrates an exterior of a smartphone 200 that is the imaging apparatus according to one embodiment of the present invention.

FIG. 9 illustrates an exterior of a smartphone 200 that is the imaging apparatus according to one embodiment of the present invention.

The smartphone 200 illustrated in FIG. 9 includes a casing 201 having a flat plate shape and comprises a display and input unit 204 in which a display panel 202 as a display surface and an operation panel 203 as an input unit are integrated on one surface of the casing 201.

The casing 201 comprises a speaker 205, a microphone 206, an operation unit 207, and a camera unit 208. The configuration of the casing 201 is not for limitation and may employ, for example, a configuration in which the display surface and the input unit are independently disposed, or a configuration that has a folded structure or a sliding mechanism.

Figure 10:
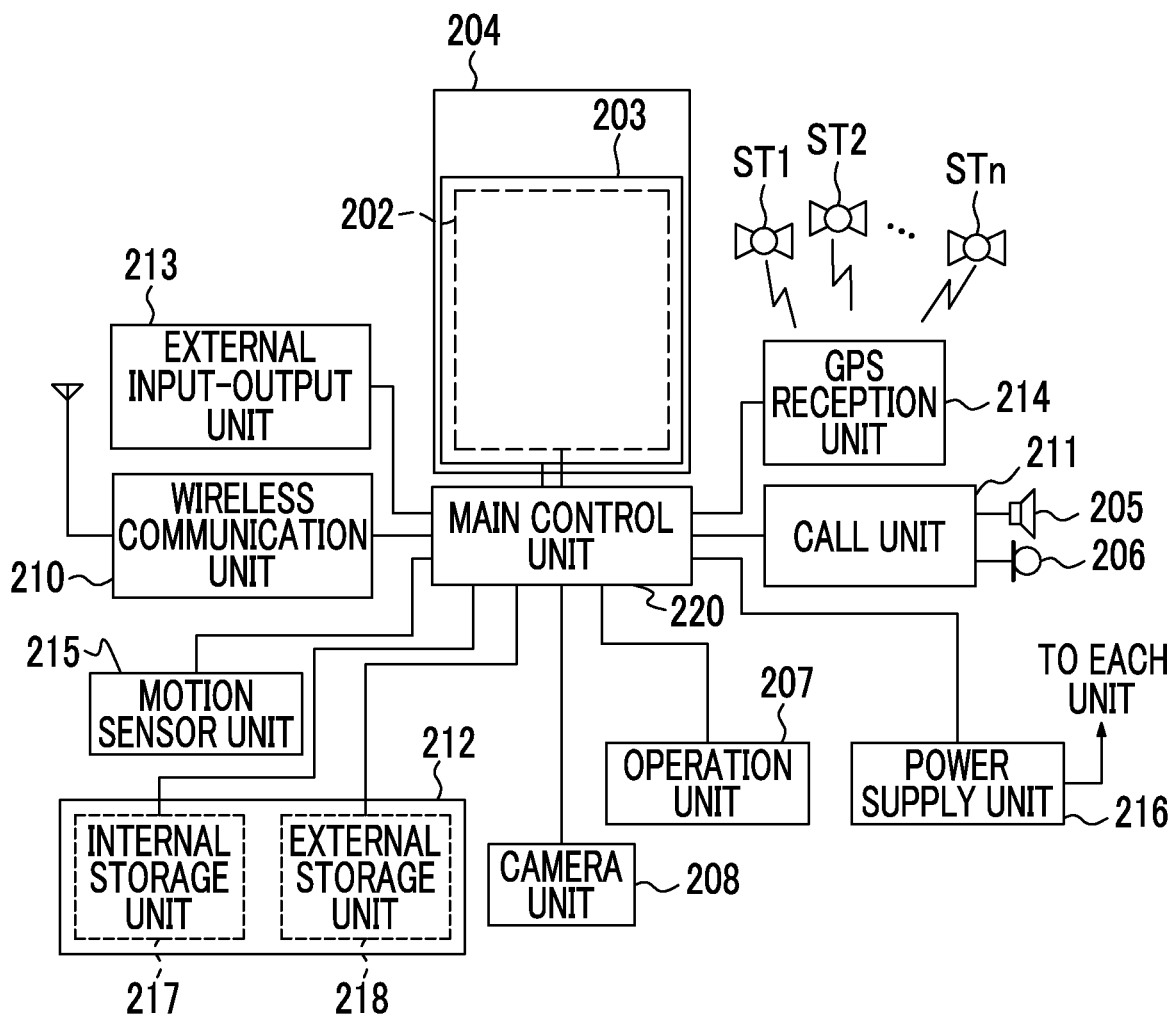
FIG. 10 is a block diagram illustrating a configuration of the smartphone 200 illustrated in FIG. 9.
Figure 11:
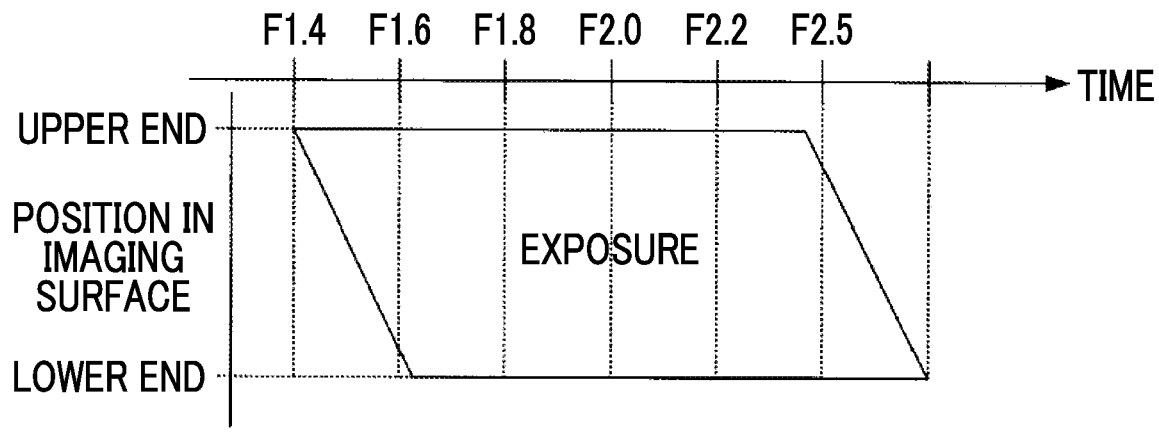
FIG. 11 is a diagram illustrating an exposure state of an imaging surface of the imaging sensor in a case where imaging is performed using a focal plane shutter and the stop is changed during exposure.

FIG. 10 is a block diagram illustrating a configuration of the smartphone 200 illustrated in FIG. 9.

As illustrated in FIG. 10, a wireless communication unit 210, the display and input unit 204, a call unit 211, the operation unit 207, the camera unit 208, a storage unit 212, an external input-output unit 213, a global positioning system (GPS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and motion images), text information, or the like and detects a user operation with respect to the displayed information under control of the main control unit 220. The display and input unit 204 comprises the display panel 202 and the operation panel 203.

The display panel 202 uses a liquid crystal display (LCD), an organic electro-luminescence display (OELD), or the like as a display device.

The operation panel 203 is a device that is placed such that an image displayed on the display surface of the display panel 202 can be visually recognized, is operated by a finger of the user or a stylus, and detects one or a plurality of coordinates. In a case where the device is operated by the finger of the user or the stylus, a detection signal generated by the operation is output to the main control unit 220. Next, the main control unit 220 detects an operation position (coordinates) on the display panel 202 based on the received detection signal.

As illustrated in FIG. 10, the display panel 202 and the operation panel 203 of the smartphone 200 illustrated as the imaging apparatus according to one embodiment of the present invention are integrated and constitute the display and input unit 204. The operation panel 203 is arranged to completely cover the display panel 202.

In a case where such arrangement is employed, the operation panel 203 may have a function of detecting the user operation even in a region outside the display panel 202. In other words, the operation panel 203 may comprise a detection region (hereinafter, referred to as a display region) for an overlapping part in overlap with the display panel 202 and a detection region (hereinafter, referred to as a non-display region) for an edge part other than the overlapping part that is not in overlap with the display panel 202.

The size of the display region and the size of the display panel 202 may completely match, but both sizes do not need to match. In addition, the operation panel 203 may comprise two sensitive regions of the edge part and an inner part other than the edge part. Furthermore, the width of the edge part is appropriately designed depending on the size and the like of the casing 201.

Furthermore, as a position detection method employed in the operation panel 203, a matrix switch method, a resistive film method, a surface acoustic wave method, an infrared method, an electromagnetic induction method, an electrostatic capacitive method, and the like are exemplified, and any of the methods can be employed.

The call unit 211 comprises the speaker 205 or the microphone 206 and converts voice of the user input through the microphone 206 into voice data processable in the main control unit 220 and outputs the voice data to the main control unit 220, or decodes voice data received by the wireless communication unit 210 or the external input-output unit 213 and outputs the decoded voice data from the speaker 205.

In addition, as illustrated in FIG. 9, for example, the speaker 205 can be mounted on the same surface as a surface on which the display and input unit 204 is disposed, and the microphone 206 can be mounted on a side surface of the casing 201.

The operation unit 207 is a hardware key that uses a key switch or the like, and receives an instruction from the user. For example, as illustrated in FIG. 9, the operation unit 207 is a push-button type switch that is mounted on a side surface of the casing 201 of the smartphone 200 and enters an ON state in a case where the switch is pressed by the finger or the like, and enters an OFF state by restoring force of a spring or the like in a case where the finger is released.

The storage unit 212 stores a control program and control data of the main control unit 220, application software, address data in which a name, a telephone number, or the like of a communication counterpart is associated, transmitted and received electronic mail data, web data downloaded by web browsing, and downloaded contents data, and temporarily stores streaming data or the like. In addition, the storage unit 212 is configured with an internal storage unit 217 incorporated in the smartphone and an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 is an interface with all external apparatuses connected to the smartphone 200 and is directly or indirectly connected to other external apparatuses by communication or the like (for example, Universal Serial Bus (USB) or IEEE1394) or through a network (for example, the Internet, a wireless LAN, Bluetooth (registered trademark), radio frequency identification (RFID), infrared communication (Infrared Data Association (IrDA) (registered trademark)), Ultra Wideband (UWB) (registered trademark), or ZigBee (registered trademark)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone.

The external input-output unit 213 can deliver data transferred from the external apparatuses to each constituent in the smartphone 200 or transfer data in the smartphone 200 to the external apparatuses.

The GPS reception unit 214 receives GPS signals transmitted from GPS satellites ST1 to STn, executes a position measurement calculation process based on the received plurality of GPS signals, and detects a position that includes a latitude, a longitude, and an altitude of the smartphone 200 in accordance with an instruction from the main control unit 220. When positional information can be acquired from the wireless communication unit 210 or the external input-output unit 213 (for example, a wireless LAN), the GPS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or an acceleration of the smartphone 200 is detected. The detection result is output to the main control unit 220.

The power supply unit 216 supplies power stored in a battery (not illustrated) to each unit of the smartphone 200 in accordance with an instruction from the main control unit 220.

The main control unit 220 comprises a microprocessor, operates in accordance with the control program and the control data stored in the storage unit 212, and manages and controls each unit of the smartphone 200. In addition, the main control unit 220 has a mobile communication control function of controlling each unit of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with an opposing apparatus by controlling the external input-output unit 213, an electronic mail function of transmitting and receiving electronic mails, or a web browsing function of browsing a web page.

In addition, the main control unit 220 has an image processing function such as displaying a video on the display and input unit 204 based on image data (data of a still image or a motion image) such as reception data or downloaded streaming data.

The image processing function refers to a function of causing the main control unit 220 to decode the image data, perform image processing on the decoding result, and display an image on the display and input unit 204.

Furthermore, the main control unit 220 executes display control for the display panel 202 and operation detection control for detecting the user operation through the operation unit 207 and the operation panel 203.

By executing the display control, the main control unit 220 displays an icon for starting the application software or a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation through the operation unit 207, receives an operation with respect to the icon and an input of a text string in an input field of the window through the operation panel 203, or receives a request for scrolling the display image through the scroll bar.

Furthermore, by executing the operation detection control, the main control unit 220 has a touch panel control function of determining whether the operation position on the operation panel 203 is in the overlapping part (display region) in overlap with the display panel 202 or the other edge part (non-display region) not in overlap with the display panel 202 and controlling the sensitive region of the operation panel 203 or a display position of the software key.

In addition, the main control unit 220 can detect a gesture operation with respect to the operation panel 203 and execute a preset function depending on the detected gesture operation.

The gesture operation is not a simple touch operation in the relate art and means an operation of drawing a trajectory by the finger or the like, designating a plurality of positions at the same time, or drawing a trajectory for at least one of the plurality of positions as a combination thereof.

The camera unit 208 includes configurations other than the external memory control unit 20, the storage medium 21, the display controller 22, the display surface 23, and the operation unit 14 in the digital camera 100 illustrated in FIG. 1.

The captured image data generated by the camera unit 208 can be stored in the storage unit 212 or be output through the external input-output unit 213 or the wireless communication unit 210.

In the smartphone 200 illustrated in FIG. 9, the camera unit 208 is mounted on the same surface as the display and input unit 204. However, the mount position of the camera unit 208 is not for limitation purposes. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in a case where the GPS reception unit 214 detects the position, the position can be detected by referring to the image from the camera unit 208. Furthermore, by referring to the image from the camera unit 208, an optical axis direction of the camera unit 208 of the smartphone 200 can be determined, or the current usage environment can be determined without using the three-axis acceleration sensor or using the three-axis acceleration sensor. The image from the camera unit 208 can also be used in the application software.

Besides, image data of a still image or a motion image to which the positional information acquired by the GPS reception unit 214, voice information (may be text information acquired by performing voice to text conversion by the main control unit or the like) acquired by the microphone 206, attitude information acquired by the motion sensor unit 215, or the like is added can be stored in the storage unit 212 or be output through the external input-output unit 213 or the wireless communication unit 210.

Even in the smartphone 200 having the above configuration, a captured image having the APD effect can be obtained without using the APD filter.

As described thus far, the following matters are disclosed in the present specification.

(1) An imaging control device incorporated in an imaging apparatus that includes an imaging sensor having an imaging surface on which a plurality of pixels are two-dimensionally arranged, and having a stop arranged in front of the imaging surface, the device comprising an imaging control unit that starts exposure of the pixels on the entire imaging surface at the same time and then, ends the exposure of the pixels at the same time in a state where light from a subject is incident on the imaging surface, by controlling an imaging sensor drive circuit which drives the imaging sensor, and a stop control unit that sequentially changes an F number of the stop to a plurality of values during a period from the start of the exposure until the end of the exposure, in which the stop control unit controls a time in which the F number is maintained at each of the plurality of values to be a time that is based on a function indicating a relationship between a distance from an optical axis center and a transmittance of light of an optical filter in which as the distance from the optical axis center is increased, the transmittance of light is decreased.

(2) The imaging control device according to (1), in which the plurality of values include a minimum first value, a maximum second value, and a third value between the first value and the second value, and a time in which the F number is maintained at the third value is longer than each of a time in which the F number is maintained at the first value and a time in which the F number is maintained at the second value.

(3) The imaging control device according to (1) or (2), in which the stop control unit decides the plurality of values of the F number based on an imaging condition.

(4) An imaging apparatus comprising the imaging control device according to any one of (1) to (3), and the imaging sensor.

(5) An imaging control method of an imaging apparatus that includes an imaging sensor having an imaging surface on which a plurality of pixels are two-dimensionally arranged, and having a stop arranged in front of the imaging surface, the method comprising an imaging control step of starting exposure of the pixels on the entire imaging surface at the same time and then, ending the exposure of the pixels at the same time in a state where light from a subject is incident on the imaging surface, by controlling an imaging sensor drive circuit which drives the imaging sensor, and a stop control step of sequentially changing an F number of the stop to a plurality of values during a period from the start of the exposure until the end of the exposure, in which in the stop control step, a time in which the F number is maintained at each of the plurality of values is controlled to be a time that is based on a function indicating a relationship between a distance from an optical axis center and a transmittance of light of an optical filter in which as the distance from the optical axis center is increased, the transmittance of light is decreased.

(6) The imaging control method according to (5), in which the plurality of values include a minimum first value, a maximum second value, and a third value between the first value and the second value, and a time in which the F number is maintained at the third value is longer than each of a time in which the F number is maintained at the first value and a time in which the F number is maintained at the second value.

(7) The imaging control method according to (5) or (6), in which in the stop control step, the plurality of values of the F number is decided based on an imaging condition.

(8) An imaging control program for a processor of an imaging apparatus that includes an imaging sensor having an imaging surface on which a plurality of pixels are two-dimensionally arranged, and having a stop arranged in front of the imaging surface, the program causing the processor to execute an imaging control step of starting exposure of the pixels on the entire imaging surface at the same time and then, ending the exposure of the pixels at the same time in a state where light from a subject is incident on the imaging surface, by controlling an imaging sensor drive circuit which drives the imaging sensor, and a stop control step of sequentially changing an F number of the stop to a plurality of values during a period from the start of the exposure until the end of the exposure, in which in the stop control step, a time in which the F number is maintained at each of the plurality of values is controlled to be a time that is based on a function indicating a relationship between a distance from an optical axis center and a transmittance of light of an optical filter in which as the distance from the optical axis center is increased, the transmittance of light is decreased.

According to the present invention, an imaging control device, an imaging apparatus, an imaging control method, and an imaging control program capable of obtaining an optimal APD effect without using an APD filter can be provided.

EXPLANATION OF REFERENCES

100: digital camera
1: imaging lens
2: stop
4: lens control unit
5: imaging sensor
60: imaging surface
61: pixel
61A: photoelectric conversion element
61B: charge holding unit
61C: charge transfer unit
61D: floating diffusion
61E: reading circuit
62: pixel row
63: drive circuit
64: signal processing circuit
65: signal line
70: N-type substrate
71: P-well layer
72: reading electrode
73: N-type impurity layer
74: P-type impurity layer
75: region
76: transfer electrode
77: reset transistor
78: output transistor
79: selection transistor
8: lens drive unit
9: stop drive unit
10: imaging sensor drive circuit
11: system control unit
11A: imaging control unit
11B: stop control unit
14: operation unit
15: memory control unit
16: memory
17: digital signal processing unit
20: external memory control unit
21: storage medium
22: display controller
23: display surface
24: control bus
25: data bus
40: lens device
200: smartphone
201: casing
202: display panel
203: operation panel
204: display and input unit
205: speaker
206: microphone
207: operation unit
208: camera unit
210: wireless communication unit
211: call unit
212: storage unit
213: external input-output unit
214: GPS reception unit
215: motion sensor unit
216: power supply unit
217: internal storage unit
218: external storage unit
220: main control unit
ST1 to STn: GPS satellite

What is claimed is:

1. An imaging control device incorporated in an imaging apparatus that includes an imaging sensor having an imaging surface on which a plurality of pixels are two-dimensionally arranged, and having a stop arranged in front of the imaging surface, the device comprising:
a processor configured to
start exposure of the pixels on the entire imaging surface at the same time and then, end the exposure of the pixels at the same time in a state where light from a subject is incident on the imaging surface, by controlling an imaging sensor drive circuit which drives the imaging sensor; and
wherein the processor sequentially changes an F number of the stop to a plurality of values during a period from the start of the exposure until the end of the exposure, and
wherein the processor controls a time in which the F number is maintained at each of the plurality of values to be a time that is based on a function indicating a relationship between a distance from an optical axis center and a transmittance of light of an optical filter in which as the distance from the optical axis center is increased, the transmittance of light is decreased.

2. The imaging control device according to claim 1,
wherein the plurality of values include a minimum first value, a maximum second value, and a third value between the first value and the second value, and
a time in which the F number is maintained at the third value is longer than each of a time in which the F number is maintained at the first value and a time in which the F number is maintained at the second value.

3. The imaging control device according to claim 1,
wherein the processor decides the plurality of values of the F number based on an imaging condition.

4. The imaging control device according to claim 2,
wherein the processor decides the plurality of values of the F number based on an imaging condition.

5. An imaging apparatus comprising:
the imaging control device according to claim 1; and
the imaging sensor.

6. An imaging apparatus comprising:
the imaging control device according to claim 2; and
the imaging sensor.

7. An imaging apparatus comprising:
the imaging control device according to claim 3; and
the imaging sensor.

8. An imaging control method of an imaging apparatus that includes an imaging sensor having an imaging surface on which a plurality of pixels are two-dimensionally arranged, and having a stop arranged in front of the imaging surface, the method comprising:
an imaging control step of starting exposure of the pixels on the entire imaging surface at the same time and then, ending the exposure of the pixels at the same time in a state where light from a subject is incident on the imaging surface, by controlling an imaging sensor drive circuit which drives the imaging sensor; and
a stop control step of sequentially changing an F number of the stop to a plurality of values during a period from the start of the exposure until the end of the exposure,
wherein in the stop control step, a time in which the F number is maintained at each of the plurality of values is controlled to be a time that is based on a function indicating a relationship between a distance from an optical axis center and a transmittance of light of an optical filter in which as the distance from the optical axis center is increased, the transmittance of light is decreased.

9. The imaging control method according to claim 8, wherein the plurality of values include a minimum first value, a maximum second value, and a third value between the first value and the second value, and a time in which the F number is maintained at the third value is longer than each of a time in which the F number is maintained at the first value and a time in which the F number is maintained at the second value.

10. The imaging control method according to claim 8, wherein in the stop control step, the plurality of values of the F number is decided based on an imaging condition.

11. The imaging control method according to claim 9, wherein in the stop control step, the plurality of values of the F number is decided based on an imaging condition.

12. A non-transitory computer recording medium storing an imaging control program for a processor of an imaging apparatus that includes an imaging sensor having an imaging surface on which a plurality of pixels are two-dimensionally arranged, and having a stop arranged in front of the imaging surface, the program causing the processor to execute:

an imaging control step of starting exposure of the pixels on the entire imaging surface at the same time and then, ending the exposure of the pixels at the same time in a state where light from a subject is incident on the imaging surface, by controlling an imaging sensor drive circuit which drives the imaging sensor; and a stop control step of sequentially changing an F number of the stop to a plurality of values during a period from the start of the exposure until the end of the exposure, wherein in the stop control step, a time in which the F number is maintained at each of the plurality of values is controlled to be a time that is based on a function indicating a relationship between a distance from an optical axis center and a transmittance of light of an optical filter in which as the distance from the optical axis center is increased, the transmittance of light is decreased.

\* \* \* \* \*